Feb. 25, 1941.  L. G. BERQUIST  2,232,993
WIRE DRAWING MACHINE
Filed July 29, 1938  7 Sheets-Sheet 1
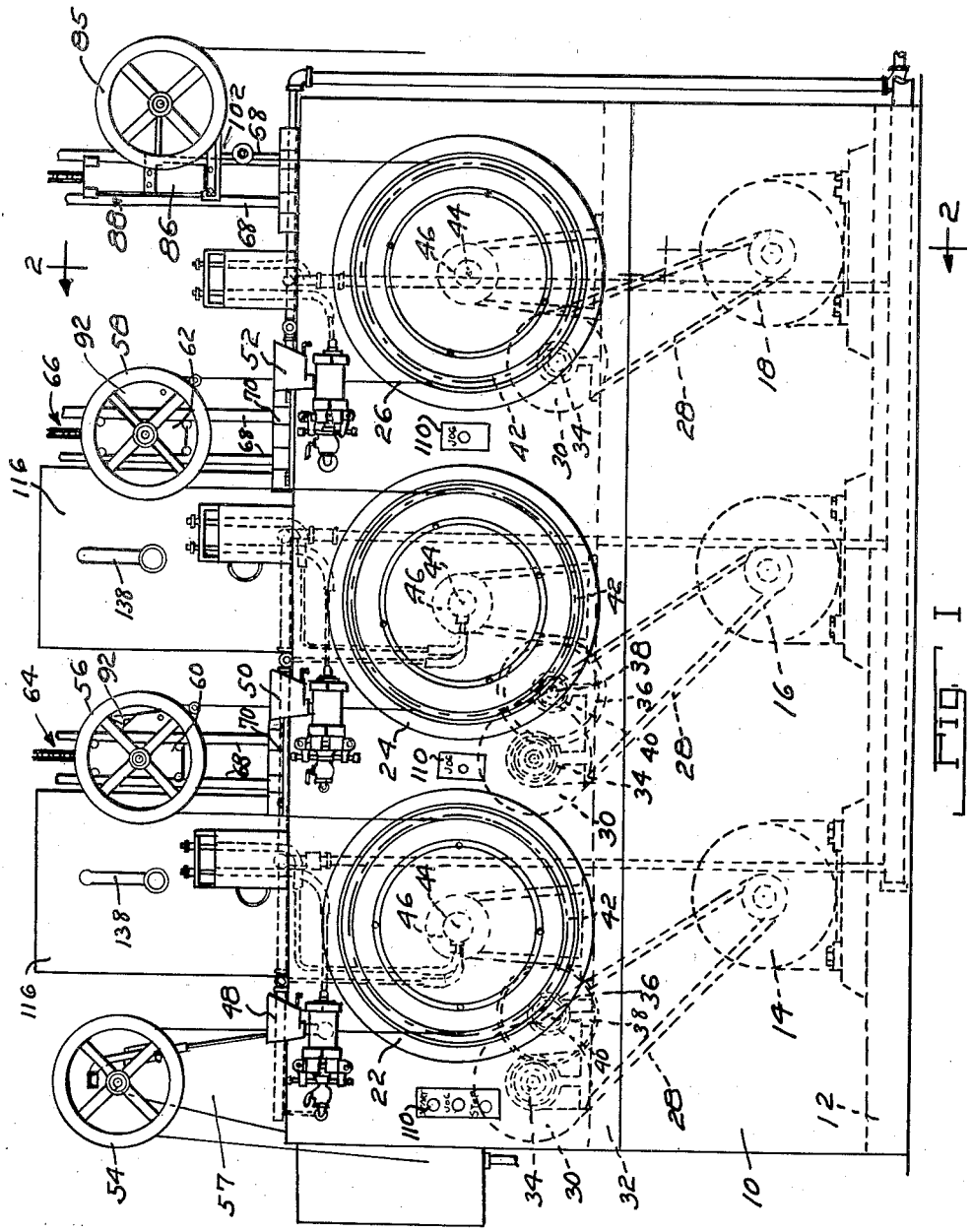
INVENTOR.
LEONARD G. BERQUIST
BY
McConkey Dawson + Booth
ATTORNEYS.

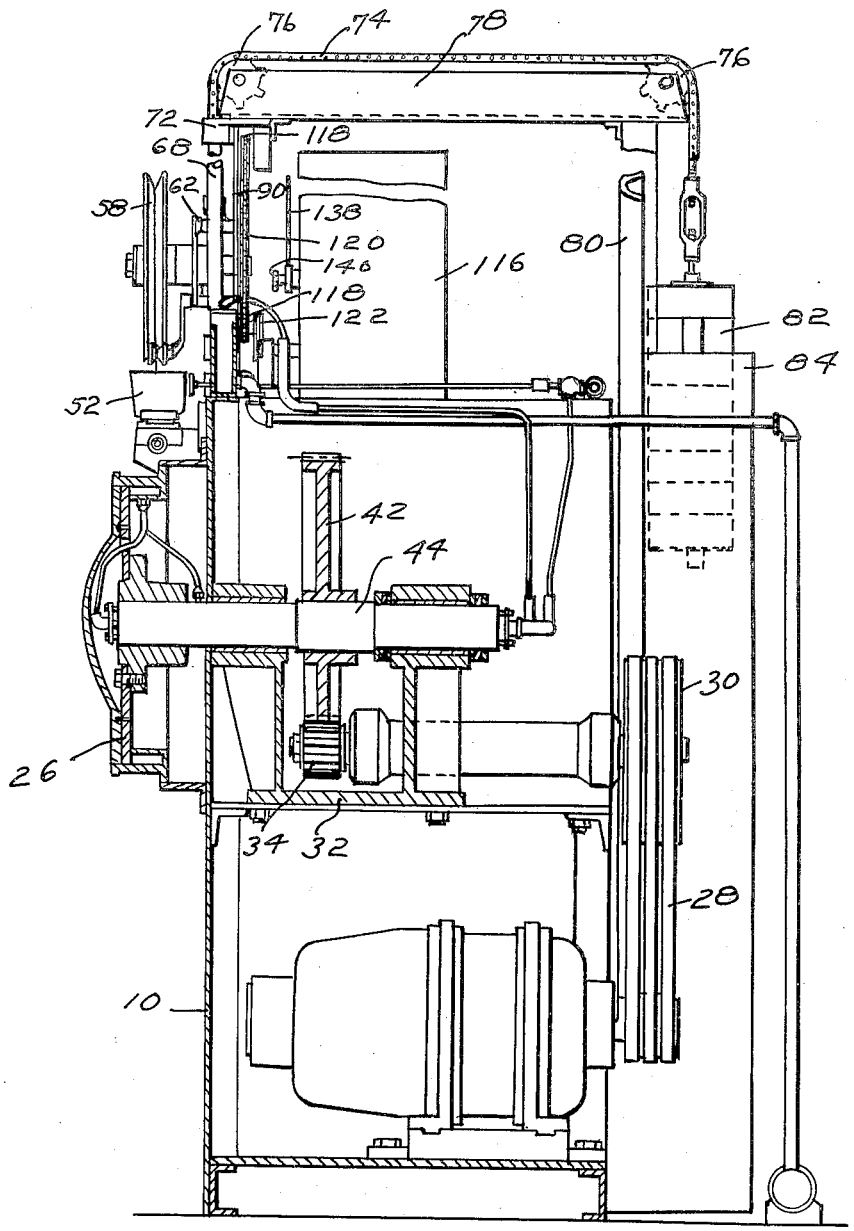

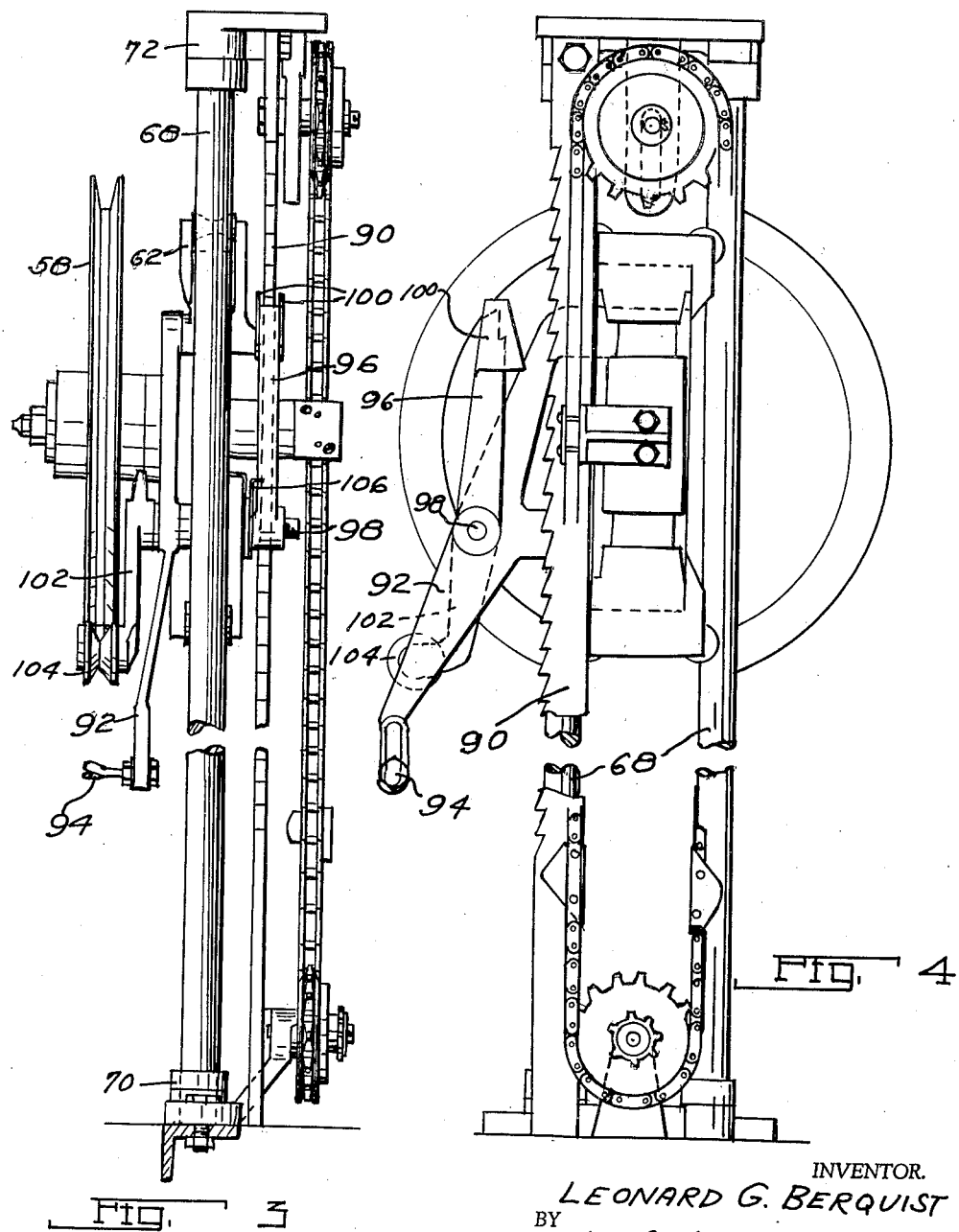

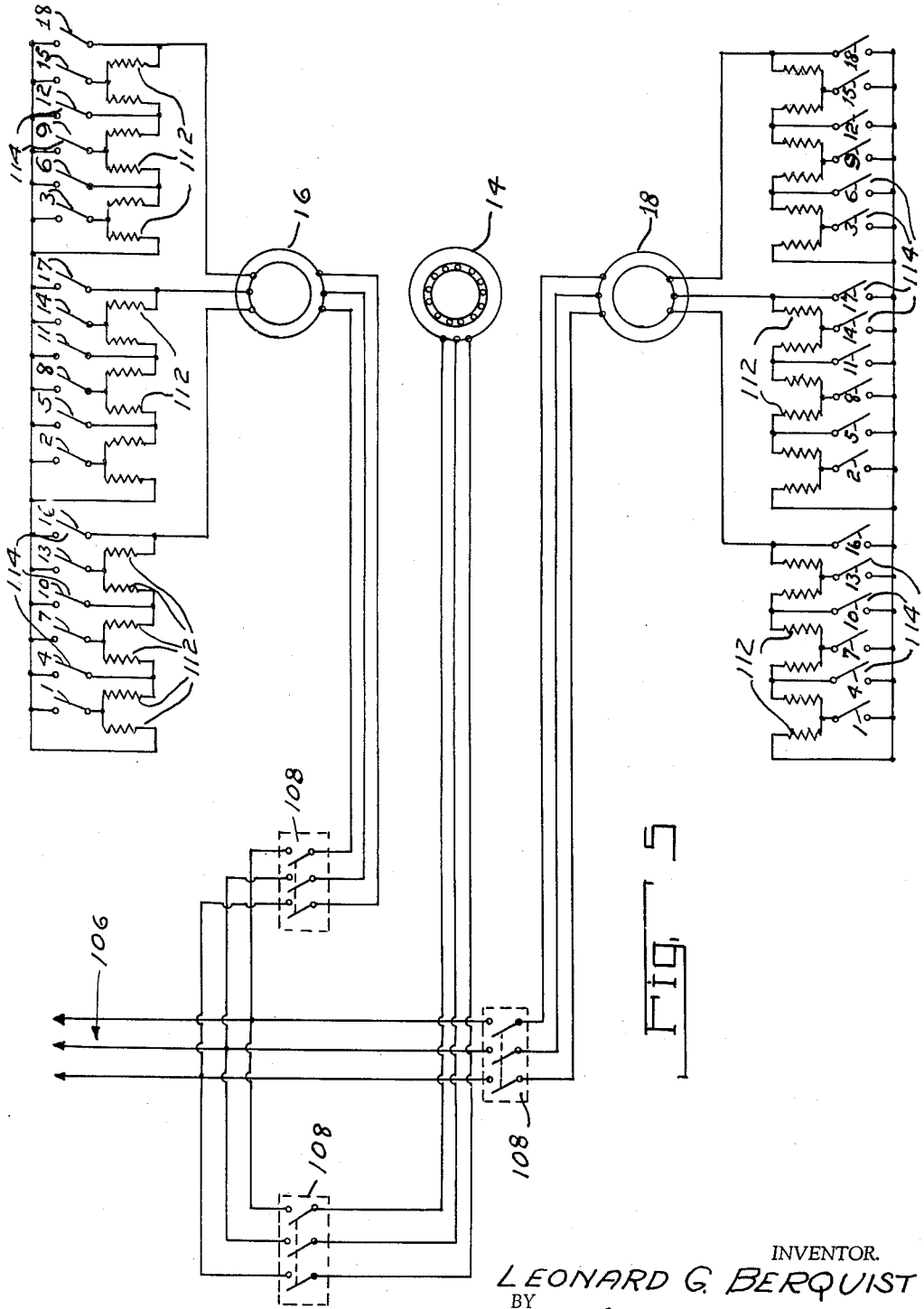

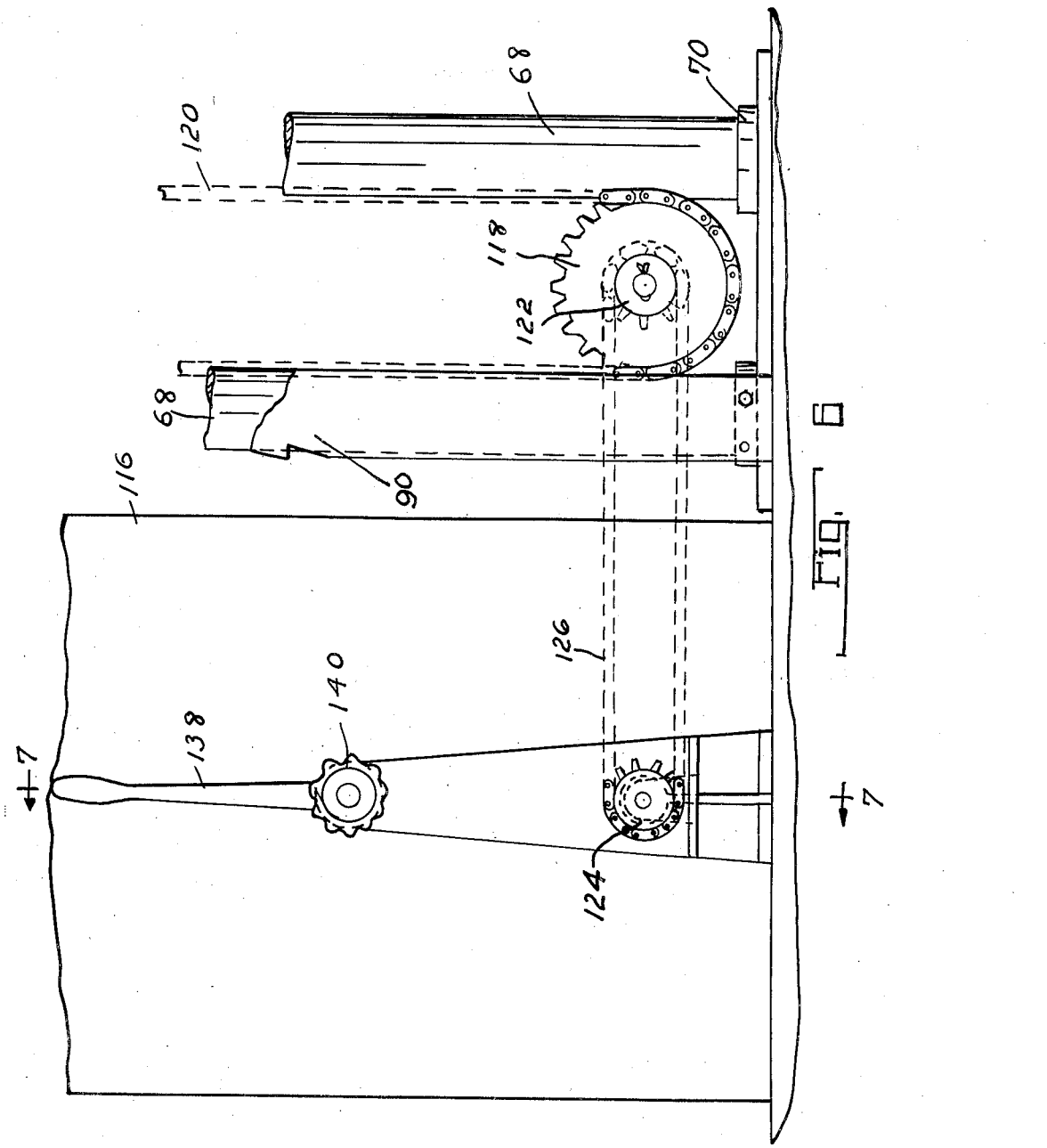

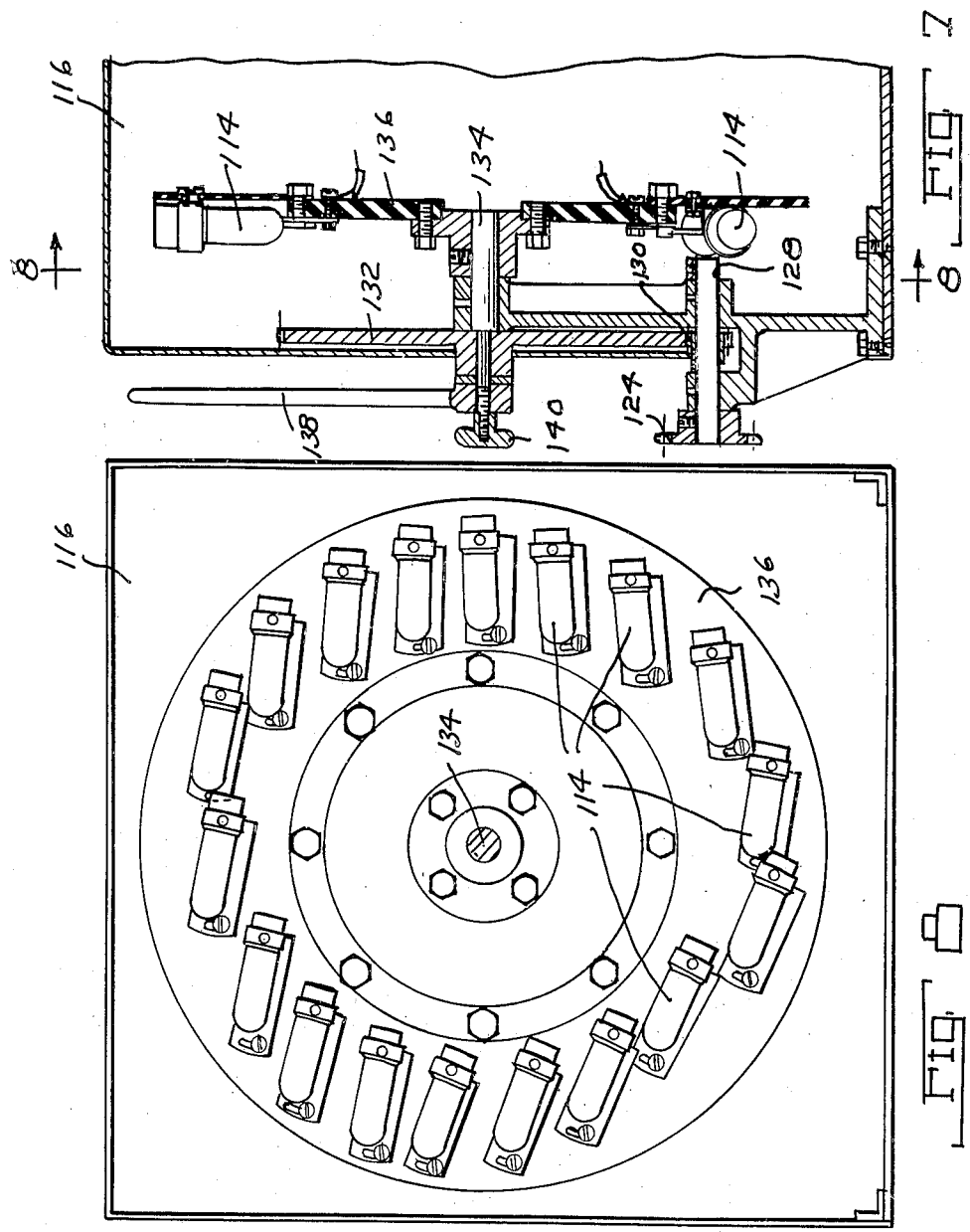

Feb. 25, 1941. L. G. BERQUIST 2,232,993
WIRE DRAWING MACHINE
Filed July 29, 1938 7 Sheets-Sheet 7
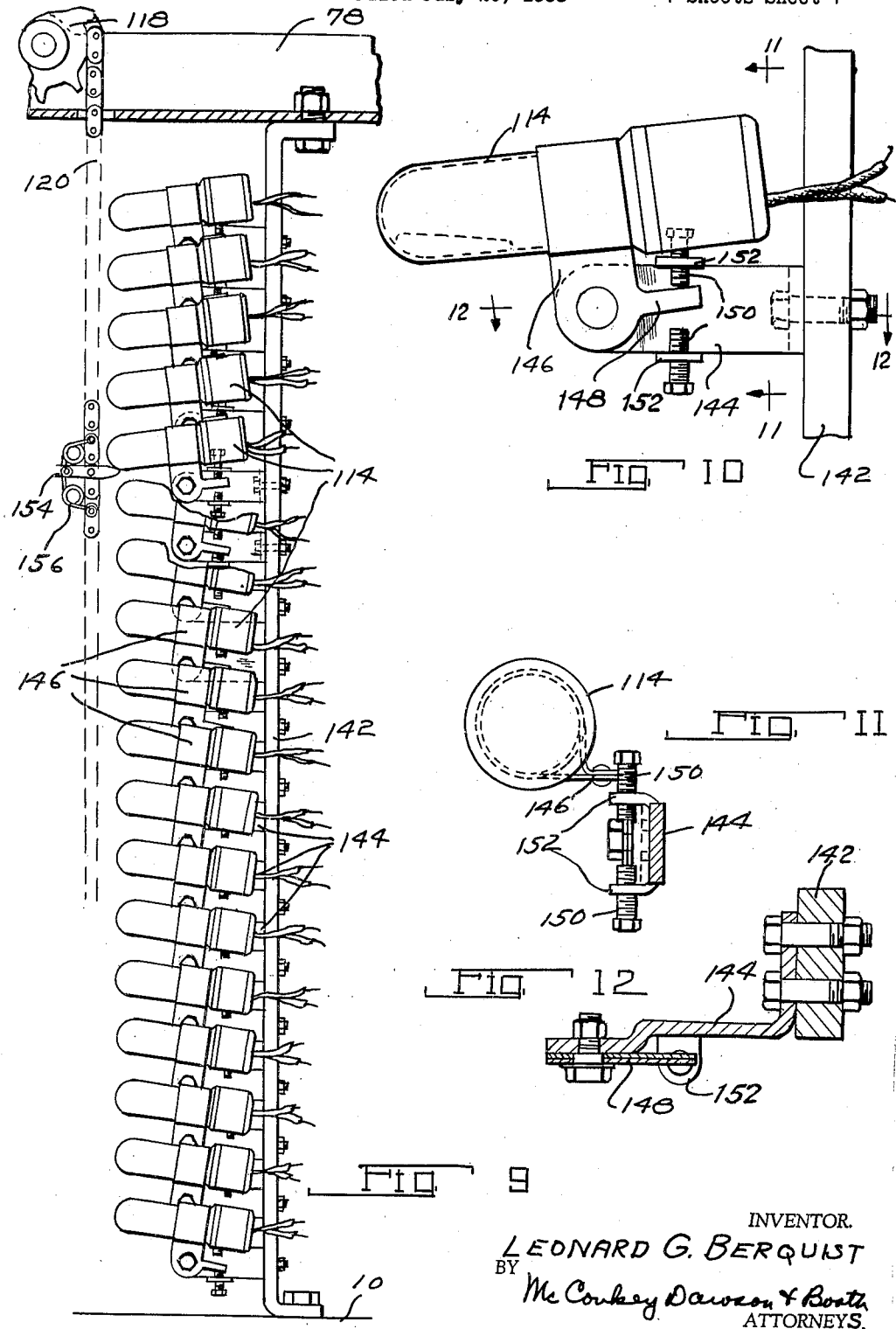
INVENTOR.
LEONARD G. BERQUIST
BY McConkey Dawson & Booth
ATTORNEYS.

Patented Feb. 25, 1941

2,232,993

UNITED STATES PATENT OFFICE 2,232,993

WIRE DRAWING MACHINE

Leonard G. Berquist, Niles, Mich., assignor to National Standard Company, Niles, Mich., a corporation of Michigan Application July 29, 1938, Serial No. 221,903

16 Claims. (Cl. 205—14)

This invention relates to wire drawing machines and more particularly to automatic controls for regulating the speed of a motor or motors for drawing the wire through a die or dies.

The invention is particularly useful in connection with a multiple die machine of the type in which motor driven capstans draw the wire through the dies and the motors are individually controlled by movable devices which place a back tension on the wire. One such machine is fully disclosed and claimed in the copending application of Robert C. Pierce, Serial No. 68,856, now Patent 2,162,357.

One of the objects of the invention is to provide a wire drawing machine in which a driving motor is automatically controlled in accordance with variations in the feed of the wire by simple reliable mechanism operable without substantial friction.

Another object of the invention is to provide a wire drawing machine in which a driving motor is controlled automatically through a circuit including a plurality of mercury switches. Preferably the switches are arranged to operate in sequence to cut resistances into or out of the motor circuit.

Still another object of the invention is to provide a wire drawing machine in which driving motor is controlled through an endless sprocket chain operated by a movable element which is moved in accordance with variations in the feed of the wire.

Other objects and advantages of the invention including novel arrangements of the switches and controls and various structural features will be apparent from the following description of the accompanying drawings, in which:

Figure 1 is a front elevation with part of the superstructure broken away of a wire drawing machine embodying the invention;

Figure 2 is a section on the line 2—2 of Figure 1;

Figure 3 is an enlarged side elevation of part of the control mechanism of Figure 2;

Figure 4 is a view at right angles to Figure 3;

Figure 5 is a wiring diagram;

Figure 6 is an enlarged partial elevation of another part of the control mechanism;

Figure 7 is a section on the line 7—7 of Figure 6 with parts in elevation;

Figure 8 is a partial section on the line 8—8 of Figure 7;

Figure 9 is an enlarged partial view of a modified construction;

Figure 10 is a further enlarged view of one of the switch mountings of Figure 9; and Figures 11 and 12 are sections on the lines 11—11 and 12—12 respectively of Figure 10.

Referring more particularly to the drawings, there is shown a three pass machine in which the wire is drawn successively through three dies of decreasing diameter although it is to be understood that the number of dies can be varied as desired. The machine includes three similar units mounted on a suitable frame 10 which is arranged to provide a lower platform 12 on which three motors 14, 16 and 18 are mounted. The first motor 14 is preferably a constant speed alternating current motor such as a squirrel cage induction motor and the motors 16 and 18 are variable speed such as phase wound rotor induction motors.

The motors drive three capstan wheels 22, 24 and 26 arranged horizontally in a vertical plane along the machine. Preferably the motors drive the capstans through multiple V-belts 28 driving pulleys 30 journalled in blocks on a second platform 32 on the frame 10, the pulleys 30 being connected to the capstans by suitable gearing.

In the first two units of the illustrated machine this gearing comprises pinions 34 mounted on the same shafts with the pulleys 30, driving gears 36 on layshafts 38 carrying additional pinions 40 which drive large gears 42 secured on shafts 44 on which the capstan wheels are mounted. The shafts 44 are journalled in blocks 46 attached to the platform 32.

In the third unit, due to the fact that each capstan must run at an average higher speed than the preceding one, one set of gears, e. g. gear 36, its layshaft 38 and pinion 40, is eliminated and the pinion 34 drives the large gear 42 directly.

Each of the capstans has associated therewith a die holder 48, 50 and 52 respectively, each containing a die (not shown) positioned with its center in the line of a vertical tangent to the left hand side of the periphery of the respective capstan. The capstans rotate counterclockwise (as seen in Figure 1) so as to draw wire vertically downward through the dies. The die holders are each arranged, in a manner not concerned with the present invention, so as to be adjustable angularly about two axes disposed at right angles in a horizontal plane to permit alinement of the die.

Wire is fed to the die in holder 48 from a guide sheave 54 rotatably mounted on a fixed bracket 57 attached to the top of the frame 10 in such a position that the wire leaves the sheaves 54 in line with the die and capstan periphery. Suitable means for supplying wire to the guide sheave from a reel or the like are shown in the said Pierce application Serial No. 68,856, filed March 14, 1936.

Wire passes from the capstan 22 to the capstan 24 and from the capstan 24 to the capstan 26 over guide sheaves 56 and 58 respectively rotatably mounted on slides 60 and 62 vertically movable on guides 64 and 66. These guides are, in one desirable arrangement, each formed of two cylindrical rods 68 secured at their lower ends in brackets 70 bolted to the top of the frame 10. The upper ends of each pair of the rods 68 are tied together by cast members 72 which are formed with spaced sockets for said upper ends connected by a horizontal flange. The slides 60 and 62 are disposed between the pairs of rods and are formed with lugs having opposite outwardly directed semi-circular grooves fitting around the rods.

In order to tension the wire as it enters the die, in the manner described and claimed in the previously mentioned copending application, sprocket chains 74 are secured to the top of each slide. These chains pass over pairs of sprockets 76 mounted on pivots at the front and rear ends of channel members 78, the front ends of which are secured to the flanges of the cast members 72 and which extend to the rear of the machine where they are supported by vertically disposed angle irons 80.

The chains pass downwardly from the rear sprockets 76 and have weights 82 suspended thereon, preferably in the same manner employed in the usual weighing scale, so that weight may be added or removed conveniently.

In the illustrative embodiment a sheet of light gage metal is formed parti-cylindrically and welded to each leg of the angle irons 80 to form a housing 84 for the weights 82.

Another guide pulley 85 swingably mounted on a slide 86 slidable in a guide 88 is positioned to receive wire from the capstan 26 and feed it under tension to a windup reel (not shown) as described in the above identified Pierce application. The movements of this slide preferably control the speed of the windup reel.

For reasons of safety it is desirable to provide means to prevent the slides 60, 62 and 86 from being thrown to the tops of their respective guides if the wire should break. According to the present invention such means may take the form of a vertical rack member 90 (Figure 3) arranged beside each of the guides. The slides 60, 62 and 86 carry brackets 92 terminating in guide eyelets 94 alined with the peripheries of the capstans 22, 24 and 26 and of the pulleys 56, 58 and 85 and pawls 96 are secured to shafts 98 journalled in the brackets in a position to engage the racks 90. As shown the free ends of the pawls are toothed to engage the racks and carry guide plates 100 engageable with the sides of the racks to guide the pawls into engagement therewith.

The pawls are operated by arms 102 secured to the shafts 98 and carrying pulleys 104 over which the wire passes between the pulleys 56, 58 and 85 and the guide eyelets 94. When the wire is tensioned it presses against the pulleys 104 to rock arms 102 and pawls 96 to the position shown in Figure 4. At this time the slides may move up or down freely on the guides. If the wire should break or become slack for some other reason the pressure against the pulleys 104 would be relieved and the pawls would swing under the influence of springs 106 into engagement with the racks 90 thereby to prevent upward movement of the slides.

One of the important features of the invention relates to the control of the variable speed motors 16 and 18 to maintain the wire tight and to draw it through each unit as fast as it leaves the preceding one. To effect this control the motors 14, 16 and 18 are connected to a power circuit as indicated in Figure 5 in which the lines 106 indicate a suitable source of three phase electric current. The motors are connected to the power source through suitable switches 108 which may be operated in the manner more particularly described and claimed in the copending application of Richard E. Koontz, Serial No. 165,621, filed Sept. 25, 1937, through suitable controls 110 (Figure 1) to open and close all of the switches simultaneously or to operate them individually.

The speed of motors 16 and 18 is controlled through suitable circuits connected to the rotors thereof and since these circuits are identical only one of them will be described in detail. The motor rotors are connected in Y hookup to a series of separate resistances 112 with switches 114 connected across the resistances in shunt. The switches are adapted to be opened and closed in sequence, the closing sequence being indicated by the numbers adjacent each switch and the opening sequence being the reverse thereof.

When all of the switches 114 are open as shown in Figure 5 all of the resistances are in circuit and the motors are running at minimum speed. As these switches are closed in sequence the resistances are shunted out until when all of the switches are closed the motors are running at maximum speed.

Preferably the switches and resistances are arranged in control boxes 116 with suitable operating connections to operate the switches from the slides 60 and 62. As shown the slide 60 operates the switches controlling the motor 16 which drives the capstan 24 on the opposite side of the die 50 from the slide and the slide 62 operates the switches controlling the motor 18.

In one desirable arrangement of switches and controls, sprockets 118 are rotatably mounted adjacent the upper and lower ends of the rods 68 with an endless sprocket chain 120 passing over them. The chains 120 are connected to the slides 60 and 62 respectively to be moved thereby as the slides move. In the arrangement of Figures 6 to 8, the lower sprocket 118 is secured to and drives a second sprocket 122 which drives a sprocket 124 on the control box 116 through a chain 126. The sprocket 124 is mounted on a rotatable shaft 128 carrying a pinion 130 meshing with a large pinion 132 which is rotatable on a shaft 134 in the control box.

At one end and inside of the control box, the shaft 134 carries a disc 136 formed of suitable insulating material and on which a series of mercury switches 114 is mounted in annular array. It will be noted that the mercury switches are mounted at different angles to open and close in sequence as the disc is rotated as described above, the mounting preferably being by a bolt and slot connection so that the angularity of the switches can be adjusted to vary the sensitivity of the control.

At its opposite end and outside of the control box the shaft 134 carries an adjusting handle 138 and a clamping nut 140 by which the handle may be clamped to the gear 132. When the nut 140 is loose the disc 136 may be turned by the handle 138 but when the nut 140 is tight the disc is connected to the gear 132 to be turned thereby.

In operation, if the machine is running and the wire between the capstan 22 and die 50 tends to get slack the slide 60 will move up under the influence of weight 82. This will move the chain 120 to turn the sprockets 118, 122 and 124 and through them the gear 132 and disc 136 in a direction to close the next one or more switches in the sequence. The resistance in the rotor circuit of motor 16 is thereby decreased so that the motor speeds up and drives the capstan 24 faster to draw the wire through the die 50 faster. Similarly if the wire tends to get too tight the slide 60 will move down to open one or more of the switches 114 to reduce the speed of the motor 16. The slide 62 controls the motor 18 in a similar manner.

Figures 9 to 12 illustrate another arrangement of the control switches and parts therein corresponding to like parts in the preceding figures are indicated by the same reference numerals. In this form a beam 142 is secured between the frame 10 and channel members 78 adjacent and parallel to one side of the sprocket chain 120. A plurality of vertically spaced brackets 144 are secured to the beam and pivotally support the mercury switches 114 through mounting clips 146. The clips 146 engage the switches substantially at the center of gravity so that when tilted to either open or closed position they will remain there until moved in the opposite direction and tongues 148 are secured to the clips and engage screws 150 adjustably carried by ears 152 on the brackets 144 to form stops limiting tilting movement of the switches.

The switches are tilted by a pawl 154 pivoted on the chain 120 and centered by a spring 156 to extend at right angles from the chain. When the chain is moved by its slide in a direction to raise the pawl 154 it will engage the tips of the switches in succession to close them. As previously explained this decreases the rotor resistance in the corresponding motor to increase its speed. Similarly when the pawl 154 moves down it tilts the switches successively to open position to decrease the motor speed.

While only two embodiments of the invention have been shown and described it will be apparent that many changes might be made therein or that other embodiments might be devised. It is therefore not intended to limit the scope of the invention to the exact forms shown nor otherwise than by the terms of the appended claims.

What is claimed is:

1. A wire-drawing machine comprising a die, means including a motor for drawing the wire through the die, means engaging the wire on the opposite side of the die from the drawing means and maintaining a substantially uniform back tension on the wire, said last named means including a part whose position is varied by variations in the feeding of the wire through the die, a control circuit for the motor including a plurality of resistances and a plurality of mercury switches for shunting out said resistances, and means operated by said part for successively opening and closing said switches.

2. A wire-drawing machine comprising a die, means including a motor for drawing the wire vertically downward through the die, means engaging the wire on the opposite side of the die from the drawing means and maintaining a substantially uniform back tension on the wire, said last named means including a vertically movable part whose vertical position is varied by variations in the feeding of the wire through the die, a control circuit for the motor including a plurality of resistances and a plurality of mercury switches for shunting out said resistances, and means operated by vertical movement of said part for successively opening and closing said switches.

3. A wire-drawing machine comprising a die, means including a motor for drawing the wire through the die, means engaging the wire on the opposite side of the die from the drawing means and maintaining a substantially uniform back tension on the wire, said last named means including a part whose position is varied by variations in the feeding of the wire through the die, a control circuit for the motor including a plurality of resistances, a rotatably mounted disc, a plurality of mercury switches mounted on said disc at different angles and connected in shunt to said resistances respectively, and a connection from said part to said disc to turn the disc thereby to open and close the switches in sequence.

4. A wire-drawing machine comprising a die, means including a motor for drawing the wire through the die, means engaging the wire on the opposite side of the die from the drawing means and maintaining a substantially uniform back tension on the wire, said last named means including a part whose position is varied by variations in the feeding of the wire through the die, a control circuit for the motor including a plurality of resistances, a series of pivotally mounted mercury switches connected in shunt to said resistances respectively, means operated by movement of said part in one direction to tilt said switches to close them, said switches being so mounted as to remain in closed position and said last named means being operated by movement of the part in the other direction to tilt the switches to open position.

5. A wire drawing machine comprising a die, means including a motor for drawing the wire through the die, a movable slide having a part engaging the wire on the opposite side of the die from the motor, means urging the slide in a direction to tension the wire, a continuous flexible tension element separate from said urging means and connected to the slide to be moved thereby, and control means for the motor operated by said tension element.

6. A wire drawing machine comprising a die, means including a motor for drawing the wire through the die, a movable slide having a part engaging the wire on the opposite side of the die from the motor, means urging the slide in a direction to tension the wire, a pair of spaced sprocket wheels, a continuous sprocket chain independent of said urging means passing over said wheels and connected to the slide to be moved thereby, and control means for the motor operated by one of said wheels.

7. A wire drawing machine comprising a die, means including a motor for drawing the wire through the die, a movable slide having a part engaging the wire on the opposite side of the die from the motor, means urging the slide in a direction to tension the wire, a pair of spaced sprocket wheels, a continuous sprocket chain passing over said wheels and connected to the slide to be moved thereby, and control means for the motor operated by one of said wheels, said control means including a rotatable disc connected to said one of the wheels, and a plurality of mercury switches arranged on the disc to be operated successively as the disc is rotated and connected in control circuits for the motor.

8. A wire drawing machine comprising a die, means including a motor for drawing the wire through the die, a movable slide having a part engaging the wire on the opposite side of the die from the motor, means urging the slide in a direction to tension the wire, a continuous tension element separate from said urging means and connected to the slide to be moved thereby, a plurality of pivotally mounted mercury switches connected in a control circuit for the motor, and means on said tension element to tilt said switches into closed or open position as the tension element is moved.

9. A wire drawing machine comprising a die, means including a motor for drawing the wire through the die, a movable slide having a part engaging the wire on the opposite side of the die from the motor, means urging the slide in a direction to tension the wire, a continuous tension element separate from said urging means and connected to the slide to be moved thereby, a plurality of pivotally mounted mercury switches connected in a control circuit for the motor, means on said tension element to tilt said switches into closed position as the tension element is moved in one direction, said switches being so mounted as to remain in closed position, said last named means tilting the switches to open position when the tension element is moved in the opposite direction.

10. A wire drawing machine comprising a plurality of dies, a plurality of capstans for drawing the wire through the dies, motors for driving the capstans, a plurality of movable parts engaging the wire on the opposite side of each die from a capstan, means urging said parts in a direction to place a tension on the wire, control circuits for the motors each including a plurality of resistances, a mercury switch connected in shunt to each of said resistances, and means operated by movement of said parts to open and close said switches thereby to control the motors.

11. A wire drawing machine comprising a plurality of dies, a plurality of capstans below the dies for drawing the wire vertically downward through the dies, a plurality of vertical guides above the dies, slides slidable on said guides and having parts over which the wire passes, means urging said slides upward to tension the wire, a motor for driving each capstan, control means for each motor including a plurality of mercury switches, rotatable plates on which said switches are mounted at different angles to open and close at different times as the plates are rotated, and means operated by vertical movement of the slides in the guides for rotating said plates.

12. A wire drawing machine comprising a plurality of dies, a plurality of capstans below the dies for drawing the wire vertically downward through the dies, a plurality of vertical guides above the dies, slides slidable on said guides and having parts over which the wire passes, means urging said slides upward to tension the wire, a motor for driving each capstan, control means for each motor including a plurality of mercury switches, means for separately pivotally mounting said switches, and means operated by vertical movement of the slides in the guides for tilting said switches to closed or open position.

13. A wire drawing machine comprising a plurality of dies, a plurality of capstans below the dies for drawing the wire vertically downward through the dies, a plurality of vertical guides above the dies, slides slidable on said guides and having parts over which the wire passes, means urging said slides upward to tension the wire, a motor for driving each capstan, sprocket wheels mounted adjacent the upper and lower ends of the guides, endless sprocket chains independent of said urging means over said wheels and connected to said slides to be moved thereby, and control means for the motors operated by movement of the chains and wheels.

14. In a wire drawing machine having a die, means including a motor for drawing the wire through the die, and movable means for applying back tension to the wire, the combination of control means comprising a rotatable shaft, a disc secured to the shaft, a plurality of mercury switches on the disc connected to control circuits for the motor and adapted to be opened and closed by rotation of the disc, a gear rotatably mounted on the shaft, means operated by said movable means to rotate the gear, and releasable means for connecting the gear to the shaft in any one of a plurality of adjusted positions, whereby the disc can be adjusted relative to the gear when the releasable means is released to adjust the relative positions of the gear and disc and the gear will drive the shaft and disc when the releasable means is connected.

15. A wire drawing machine comprising a horizontal die, a vertical guide extending above the die, means including a motor below the die for drawing the wire downwardly therethrough, a slide member mounted on the guide and including a part over which the wire passes before entering the die, means for urging said slide member upwardly on the guide to tension the wire, a control circuit for the motor including a plurality of resistances and a plurality of mercury switches for shunting out said resistances, means operated by movement of said slide member in response to variations in the rate of feed of the wire for tilting said switches to open and closed position, a vertical rack member adjacent the guide, and a pawl pivoted on the slide and engageable with the rack, said pawl including a part engaging the wire to hold the pawl in inoperative position as long as the wire is tensioned and said pawl engaging the rack when the wire breaks to lock the slide against movement thereby preventing violent operation of the mercury switches.

16. A wire drawing machine comprising a horizontal die, a vertical guide extending above the die, means including a motor below the die for drawing the wire downwardly therethrough, a slide member mounted on the guide and including a part over which the wire passes before entering the die, means for urging said slide member upwardly on the guide to tension the wire, a continuous tension element separate from said urging means and connected to the slide member to be moved thereby, a plurality of pivotally mounted mercury switches connected in a control circuit for the motor, a part on said tension element to engage said switches and tilt them to closed and open position as the tension element is moved, a rack adjacent the guide, and a pawl pivoted on the slide member and engaging the wire to be held out of engagement with the rack and engageable with the rack if the wire should break to lock the slide thereby preventing violent operation of the mercury switches by said part.

LEONARD G. BERQUIST.